(12) United States Patent
Grebner et al.

(10) Patent No.: US 12,498,086 B2
(45) Date of Patent: Dec. 16, 2025

(54) WRAPPING MADE OF FIBRE COMPOSITE PLASTIC FOR A SPACE TRAVEL VESSEL JACKET

(71) Applicant: PEAK Technology GmbH, Holzhausen (AT)

(72) Inventors: Dieter Grebner, Linz (AT); Philipp Heher, Mank (AT)

( * ) Notice: Subject to any disclaimer, the term of this patent is extended or adjusted under 35 U.S.C. 154(b) by 0 days.

(21) Appl. No.: 18/289,633

(22) PCT Filed: May 4, 2022

(86) PCT No.: PCT/AT2022/060155
§ 371 (c)(1),
(2) Date: Nov. 6, 2023

(87) PCT Pub. No.: WO2022/232858
PCT Pub. Date: Nov. 10, 2022

(65) Prior Publication Data
US 2024/0240752 A1 Jul. 18, 2024

(30) Foreign Application Priority Data
May 6, 2021 (AT) .............. A 50349/2021

(51) Int. Cl.
F17C 1/06 (2006.01)
(52) U.S. Cl.
CPC ........ F17C 1/06 (2013.01); *F17C 2203/0609* (2013.01); *F17C 2203/067* (2013.01); *F17C 2270/0194* (2013.01)
(58) Field of Classification Search
None
See application file for complete search history.

(56) References Cited

U.S. PATENT DOCUMENTS

| | | | | |
|---|---|---|---|---|
| 2002/0028332 A1* | 3/2002 | Pratt | ............... | A63B 59/50 428/364 |
| 2003/0082397 A1* | 5/2003 | Kono | ............... | C22C 47/025 428/293.1 |

(Continued)

FOREIGN PATENT DOCUMENTS

| | | |
|---|---|---|
| DE | 102005008252 A1 | 9/2006 |
| DE | 102018217252 B4 | 4/2020 |

(Continued)

OTHER PUBLICATIONS

Espacenet English-language Abstract for DE102005008252 A1, Sep. 7, 2006.

*Primary Examiner* — Don M Anderson
(74) *Attorney, Agent, or Firm* — Tiajoloff & Kelly LLP

(57) ABSTRACT

A fiber composite plastic overwrap for a spacecraft container shell (8), in particular in connection with spacecraft containers, provides burnup as complete as possible on re-entry into the Earth's atmosphere despite good strength properties and simple production with the aid of conventional fiber winding processes. The overwrap comprises at least one winding tape (1) of a plastic matrix (2) in which at least two tape layers (3, 4) arranged one above the other in a transverse tape direction (y) are embedded. Each of the tape layers (3, 4) comprises a plurality of fiber bundles (5) extending unidirectionally in the longitudinal tape direction (x), Fiber bundles (5) of a tape layer (3, 4) adjacent in the longitudinal tape direction (x) directly adjoin one another in abutment regions (6) provided at least once per winding turn, and fiber bundles (5) adjacent in the transverse tape direction (y) are offset relative to one another in the longitudinal tape direction (x), forming an overlap region (7).

8 Claims, 3 Drawing Sheets

(56) References Cited

U.S. PATENT DOCUMENTS

Figure 1:
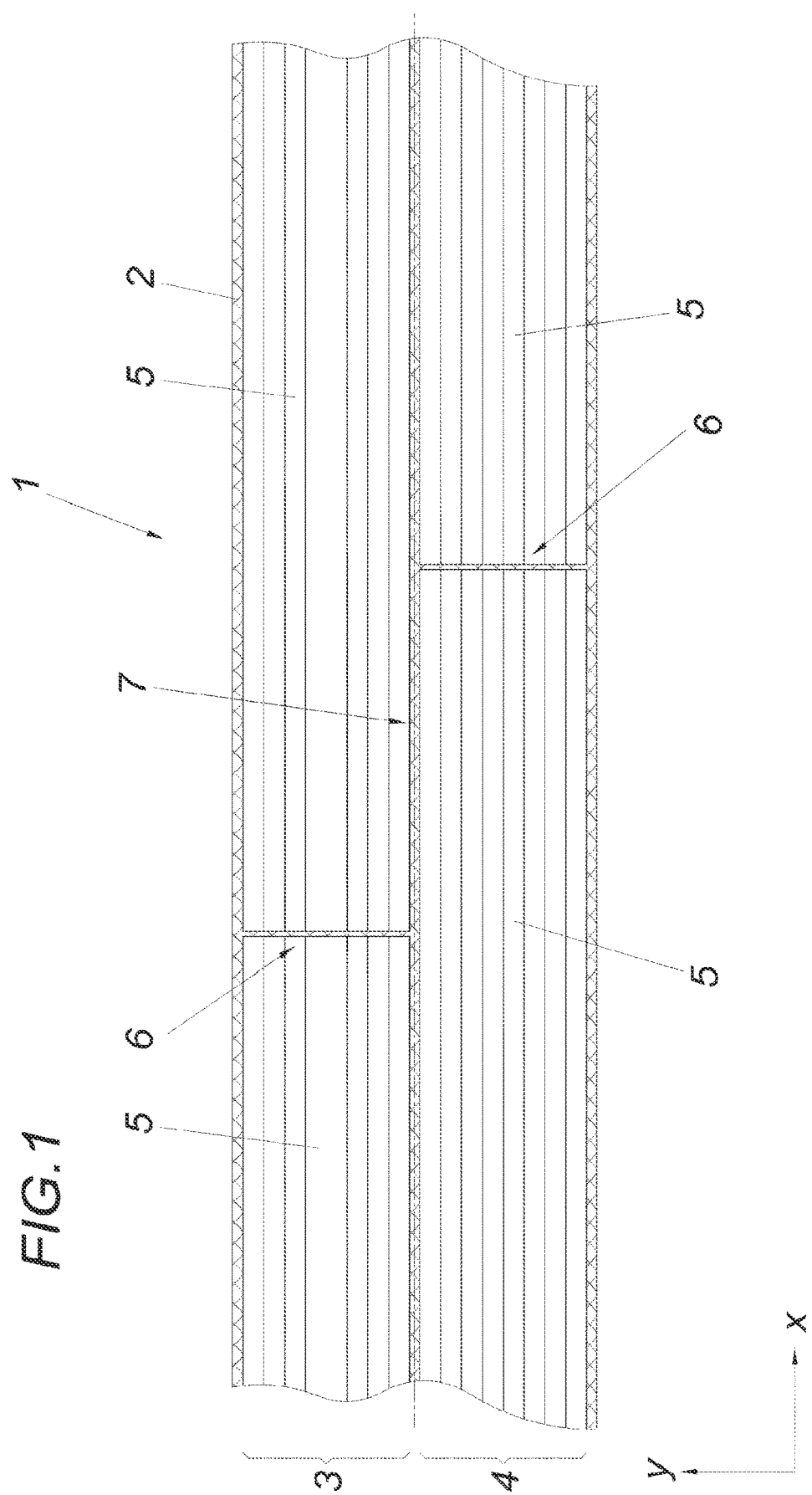

| | | | |
|---|---|---|---|
| 2007/0205201 A1* | 9/2007 | Cundiff | F17C 1/06 220/591 |
| 2012/0241459 A1 | 9/2012 | Tuttle | |
| 2013/0105501 A1* | 5/2013 | Vanswijgenhoven | F17C 1/02 220/660 |
| 2014/0004297 A1* | 1/2014 | Weisberg | B32B 3/263 428/114 |
| 2019/0170297 A1 | 6/2019 | Criel et al. | |
| 2019/0290978 A1* | 9/2019 | Mordasini | A63B 60/42 |
| 2019/0375185 A1* | 12/2019 | Kratzer | C08J 5/246 |
| 2019/0390821 A1 | 12/2019 | Katano et al. | |
| 2021/0261770 A1* | 8/2021 | Elkovitch | C08J 5/10 |
| 2021/0283867 A1* | 9/2021 | Jörn | B32B 27/12 |
| 2022/0196208 A1* | 6/2022 | Vanswijgenhoven | B29C 70/86 |
| 2024/0009983 A1* | 1/2024 | Steinhauer | B32B 5/02 |

FOREIGN PATENT DOCUMENTS

| | | |
|---|---|---|
| EP | 1125728 A1 | 8/2001 |
| EP | 1419875 A1 | 5/2004 |

\* cited by examiner

WRAPPING MADE OF FIBRE COMPOSITE PLASTIC FOR A SPACE TRAVEL VESSEL JACKET

TECHNICAL AREA

The invention relates to a fiber composite plastic overwrap for a spacecraft container shell, and to a winding tape for such an overwrap.

STATE OF THE ART

Spacecraft container shells, such as those used for pressure vessels of e.g. rocket stages, satellites, etc., are regularly made of aluminum for reasons of fluid tightness and have an overwrap of a fiber composite plastic as the primary structure-forming and force-absorbing component. Such a pressure vessel is known, for example, from US 20120241459 A1.

In the manufacture of such pressure vessels, known as COPVs (composite overwrapped pressure vessels), the spacecraft container shell is usually subjected to a fiber winding process in which fibers, for example carbon fibers, are pre-impregnated with a reactive resin and then fed to the container shell to be wound via a predetermined winding pattern. Such winding of fiber composites is associated with particularly advantageous strength increases due to the high tensile strength of the fiber strand combined with low weight of the pressure vessel. Due to the usually high burnup temperatures of the fibers, they provide an insulating layer for the metallic spacecraft container shell upon re-entry into the Earth's atmosphere, which results in poorer burnup behavior compared with an overwrap-free container shell. The fact that neither the overwrap nor the underlying container shell can be sufficiently degraded upon re-entry into the Earth's atmosphere results in the increased risk of space debris striking the Earth's surface.

REPRESENTATION OF THE INVENTION

The invention is thus based on the task of designing an overwrap of the type described at the beginning in such a way that, in particular in connection with spacecraft containers, burnup is as complete as possible on re-entry into the Earth's atmosphere despite good strength properties and simple production with the aid of conventional fiber winding processes.

The invention solves the problem in that the overwrap comprises at least one winding tape of a plastic matrix in which at least two tape layers arranged one above the other in a transverse tape direction are embedded, wherein each these tape layers comprises a plurality of fiber bundles extending unidirectionally in the longitudinal tape direction, wherein fiber bundles of a tape layer adjacent in the longitudinal tape direction directly adjoin one another in abutment regions provided at least once per winding turn, and wherein fiber bundles adjacent in the transverse tape direction are offset relative to one another in the longitudinal tape direction, forming an overlap region.

As a result of these features, in contrast to conventional fiber matrix overwraps which have a single continuous fiber strand embedded in a plastic matrix, an overwrap is provided having several fiber bundles which are connected to one another by the plastic matrix in such a way that the fiber bundles of a tape layer are directly adjacent to one another in the abutment regions. For the purposes of the invention, a fiber bundle is understood to be a group of individual fibers which are cut or terminate at the beginning and end of the fiber bundle. As a result, the burnup behavior of the wound spacecraft container can be decisively improved upon re-entry into the Earth's atmosphere, because after pyrolysis of the plastic matrix, the fiber bundles embedded therein can be effectively detached by aerodynamic shear forces, so that subsequently the underlying container shell is also sufficiently exposed for reliable melting and is not prevented from melting by fibers having an insulating effect. Although additional stress concentrations are introduced into the overwrap due to the abutment regions formed only by the plastic matrix, sufficient stiffness and strength of the overwrap can nevertheless be achieved in practice if the winding tape has at least two tape layers arranged one above the other in a transverse tape direction, with fiber bundles adjacent in the transverse tape direction being offset from one another in the longitudinal tape direction to form an overlap region. Although the separation of a continuous fiber strand into individual fiber bundles initially reduces the tensile strength of the winding tape, the overlaps according to the invention can not only produce the tensile strength required for an overwrap, but also reduce the effect of stress concentration. In order to allow problem-free shear force-induced detachment of the fiber bundles in connection with spacecraft container shells, the number of fiber bundles per tape layer must be selected so that at least one abutment region results for each winding turn of the winding tape, i.e. also for each winding turn around the spacecraft container shell to be wound.

To achieve the best possible strength values for the overwrap, it is recommended that the overlap region extends over at least 1 cm in the longitudinal tape direction. As a result of these measures, the abutment regions of the fiber bundles adjacent in the transverse tape direction and thus also the stress concentration points occurring there are offset by at least 1 cm in the longitudinal tape direction, so that an improved stress distribution in the longitudinal tape direction is achieved.

Particularly favorable strength conditions result when fiber bundles adjacent to each other in the longitudinal tape direction have abutting surfaces which are inclined to the normal cross-sectional surface of the winding tape. Preferably, the fiber bundles in the abutment region are scarfed with respect to the tape width direction. As a result of these measures, the stress concentration occurring in the abutment regions can be reduced and thus the strength properties of the overwrap further improved.

The invention also relates to a winding tape for an overwrap described above. In this case, a plastic matrix is provided in which at least two tape layers arranged one above the other in a transverse tape direction are embedded, wherein each of these tape layers comprises a plurality of fiber bundles extending unidirectionally in the longitudinal tape direction, wherein adjacent fiber bundles of a tape layer directly adjoin one another in the longitudinal tape direction at least once in provided abutment regions at predetermined intervals. Adjacent fiber bundles in the transverse tape direction are offset relative to one another in the longitudinal tape direction with the formation of an overlap region. Preferably, the plastic matrix is a thermosetting resin. The fiber bundles can be formed from fiber types such as carbon fibers, aramid fibers, glass fibers, and/or PE-UHMW fibers.

In order to be able to adapt the mechanical property profile of the winding tape respectively the overwrap as best as possible to the given circumstances, it can also be provided that a winding tape has only fiber bundles which contain only a single fiber type, or else that a combination of fiber bundles of different fiber types is present. It may also be provided that the fiber bundles themselves are formed from a combination of different fiber types. As a result of these measures, the mechanical properties of the winding tape respectively the overwrap can be defined in a particularly favorable manner, taking into account the respective different stiffness, tensile strength, ductility, etc. of the fiber types used.

For the production of such winding tapes, it can be provided, for example, that at least two continuous fiber-reinforced winding tapes pre-impregnated with a thermosetting resin as plastic matrix are first cut into several tape sections, after which the not yet cured resin of the respective tape sections is softened by heat input and the tape sections are joined to each other via the plastic matrix to form the winding tape according to the invention. The prefabricated winding tape formed in this way can then be used in a known fiber winding process.

BRIEF DESCRIPTION OF THE INVENTION

In the drawing, the object of the invention is shown, for example. It shows

Figure 2:
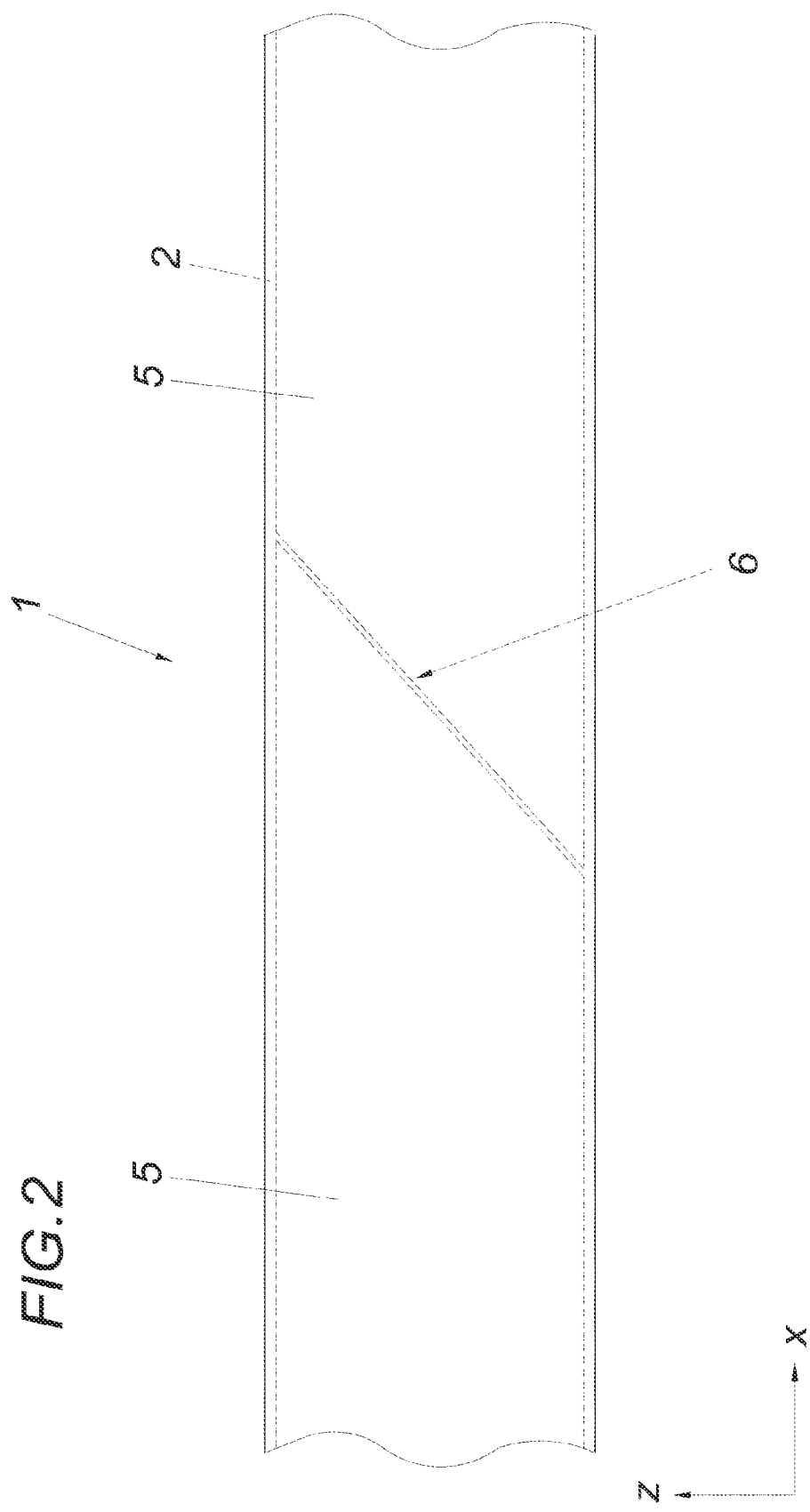
Figure 3:
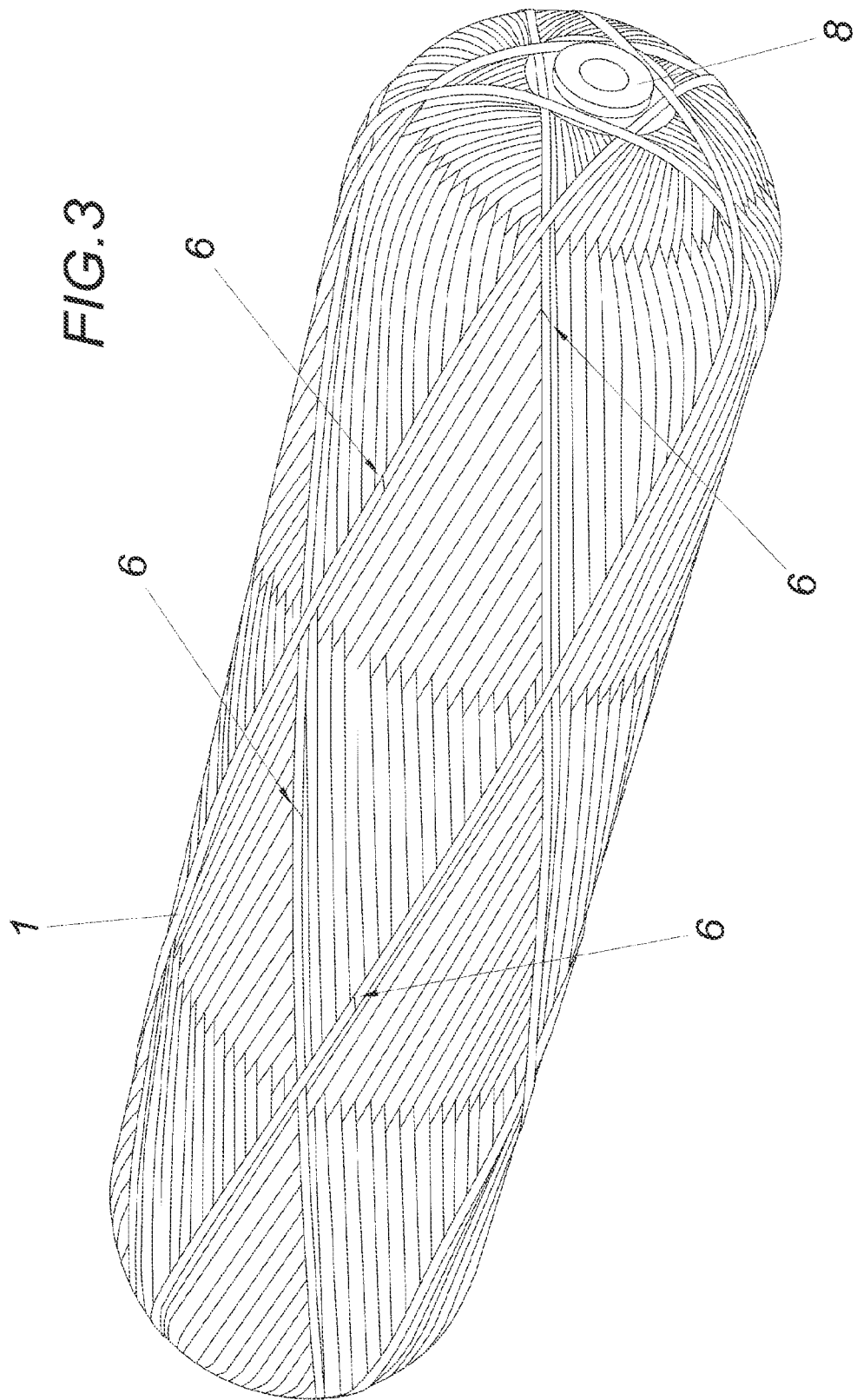

FIG. 1 a schematic longitudinal section through a winding tape according to the invention, FIG. 2 a schematic top view of the winding tape from FIG. 1 and FIG. 3 a schematic oblique view of a spacecraft container shell having an overwrap according to the invention.

WAYS TO CARRY OUT THE INVENTION

An overwrap made of a fiber composite plastic according to the invention comprises at least one winding tape 1 made of a plastic matrix 2, in which at least two tape layers 3, 4 arranged one above the other in a transverse tape direction y and each comprising a plurality of fiber bundles 5 extending unidirectionally in the longitudinal tape direction x are embedded.

To allow the fiber bundles 5 to be detached without problems due to shear forces on re-entry into the Earth's atmosphere, the number of fiber bundles 5 per tape layer 3 or 4 must be selected so that adjacent fiber bundles 5 of a tape layer 3 or 4 in the longitudinal tape direction x are directly adjacent to one another at least once in each winding turn of the winding tape, and thus also in each winding turn of a container shell to be wound.

Fiber bundles 5 adjacent in the transverse tape direction y are offset from one another in the longitudinal tape direction x to form an overlap region 7. The overlaps according to the invention can not only produce the tensile strength required for an overwrap, but also reduce the effect of stress concentrations caused by the abutment regions 6. Preferably, the overlap region 7 extends over at least 1 cm in the longitudinal tape direction x.

For particularly advantageous strength conditions, it can be provided that fiber bundles 5 adjacent to each other in longitudinal tape direction x have abutting surfaces which are inclined to the normal cross-sectional surface of the winding tape 1. This means that the fiber bundles 5 in the abutment region 6 are formed as scarfed with respect to the tape width direction z, as indicated in FIG. 2.

FIG. 3 shows a schematic oblique view of a spacecraft container shell 8 which has an overwrap according to the invention, which overwrap is applied to the spacecraft container shell 8 using a predetermined winding pattern. As indicated in FIG. 2, the winding tape 1 has at least one abutment region 6 for each winding turn of the spacecraft container shell 8 to be wound. For overview purposes, only four such abutment regions 6 have been drawn in FIG. 2, which are intended to be representative of the entire abutment regions 6 that occur.

The invention claimed is:

1. A fiber composite plastic overwrap for a spacecraft container shell, said overwrap comprising:
   at least one winding tape of a plastic matrix in which at least two tape layers arranged one above the other in a transverse tape direction are embedded;
   wherein each of the tape layers comprises a plurality of fiber bundles extending unidirectionally in a longitudinal tape direction;
   wherein the fiber bundles of each of the tape layers that are adjacent in the longitudinal tape direction directly adjoin one another in abutment regions provided at least once per winding turn; and
   wherein the fiber bundles adjacent in the transverse tape direction are offset relative to one another in the longitudinal tape direction so as to form an overlap region
   said winding tape being longer in the longitudinal tape direction than a width thereof perpendicular to the longitudinal tape direction.

2. The overwrap according to claim 1, wherein the overlap region extends over at least 1 cm in the longitudinal tape direction.

3. The overwrap according to claim 1, wherein fiber bundles adjacent to one another in the longitudinal tape direction have abutting surfaces that are inclined relative to a normal cross-section of the winding tape.

4. Winding tape for a fiber composite plastic overwrap for a spacecraft container shell, said winding tape comprising:
   a plastic matrix in which at least two tape layers arranged one above the other in a transverse tape direction are embedded;
   wherein each of the tape layers comprises a plurality of fiber bundles extending unidirectionally in a longitudinal tape direction;
   wherein adjacent fiber bundles of each of the tape layers directly adjoin one another in the longitudinal tape direction in abutment regions at predetermined intervals; and
   wherein adjacent fiber bundles in the transverse tape direction are offset relative to one another in the longitudinal tape direction so as to form an overlap region
   said winding tape being longer in the longitudinal tape direction than a width thereof perpendicular to the longitudinal tape direction.

5. The winding according to claim 4, wherein the plastic matrix is a thermosetting resin and the fiber bundles are formed of carbon fibers, aramid fibers, glass fibers and/or PE-UHMW fibers.

6. The overwrap according to claim 2, wherein fiber bundles adjacent to one another in the longitudinal tape direction have abutting surfaces that are inclined to a normal cross-section of the winding tape.

7. The overwrap according to claim 1, wherein the fiber bundles extend longitudinally away from the overlap region a longitudinal distance that is greater than a longitudinal length of the overlap region.

8. The winding according to claim 4, wherein the fiber bundles extend longitudinally away from the overlap region a longitudinal distance that is greater than a longitudinal length of the overlap region.

* * * * *